United States Patent [19]

Buijs et al.

[11] 4,345,838

[45] Aug. 24, 1982

[54] APPARATUS FOR SPECTROMETER ALIGNMENT

[76] Inventors: Henry L. Buijs, 2052 Dickson, Sillery, Quebec; Garry L. Vail, 35 Route Penney, Neuschatel, Quebec, both of Canada, G2A 3C5; Jean-Noel Berube, 1425 des Metairies, Ancienne Lorette, Quebec, Canada, G2E 4J7

[21] Appl. No.: 173,702

[22] Filed: Jul. 30, 1980

[30] Foreign Application Priority Data

Aug. 31, 1979 [CA] Canada ................................. 334846

[51] Int. Cl.³ .............................................. G01B 9/02
[52] U.S. Cl. ..................................... 356/346; 356/363
[58] Field of Search .................................. 356/346, 363

[56] References Cited

U.S. PATENT DOCUMENTS 4,053,231 10/1977 Fletcher et al. ................ 356/346 X Primary Examiner—F. L. Evans
Assistant Examiner—Matthew W. Koren
Attorney, Agent, or Firm—Larson and Taylor

[57] ABSTRACT

A Fourier transform spectrometer in which an alignment system is provided for keeping the moving mirror accurately parallel to its original orientation. A reference laser beam is supplied to the spectrometer and if the moving mirror tilts to become out of parallelism then bars appear in the output field. Three detectors arranged at the vertices of a right-angled triangle detect such bars and provide error signals to a mirror control system. The detectors also receive spurious signals caused by stray reflections at the beamsplitter-compensator plate. By providing a square-shaped reference beam which is masked by an L-shaped opening such spurious signals are eliminated.

2 Claims, 5 Drawing Figures

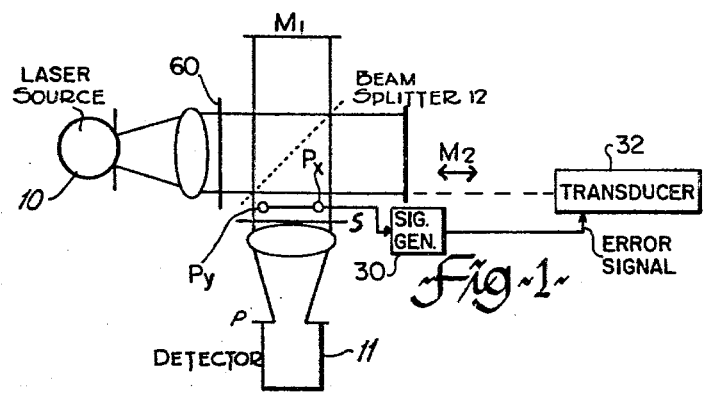
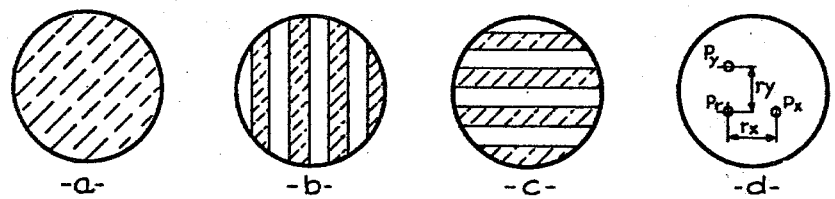
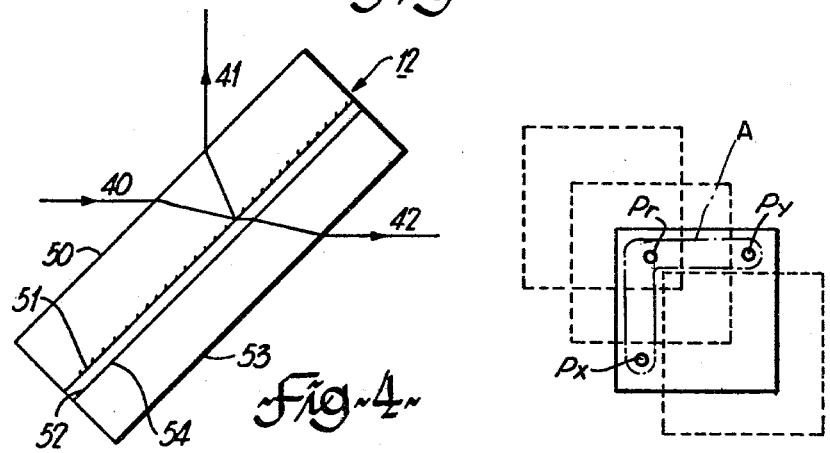
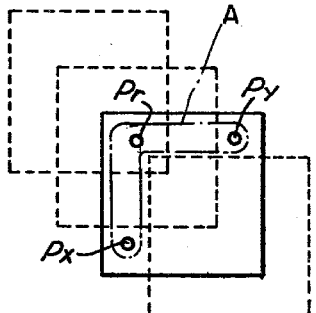

APPARATUS FOR SPECTROMETER ALIGNMENT

This invention relates to an improvement in Fourier transform spectrometers and, specifically, to detection systems useful for maintaining mirror alignment.

The interferogram obtained at the output of such a spectrometer is an intensity variation in output radiation caused by the scanning movement of one of the mirrors in the spectrometer. In effect, the interferogram is the composite of a great number of interference patterns caused by the different frequency components in the signal incident on the spectrometer. By performing a Fourier transformation of the interferogram the spectrum of the incident radiation can be obtained.

One of the limitations on the degree of spectral detail that may be obtained with the technique is the requirement of high alignment stability of the interferometer optics over a large range of mirror displacement. The degree of stability required is related to the shortest wavelength of radiation to be analyzed: the moving mirror must remain parallel to its initial orientation to within a small fraction of this wavelength across the mirror diameter. The range of mirror displacement determines the resolution in the computed spectrum.

It is known to provide a sensing mechanism that senses the state of alignment of a scanning Michelson interferometer on a continuous basis and such that error signals proportional to small tilts along two linearly independent axes are generated. The error signals are amplified and applied to displacement transducers mounted on either the stationary or moving mirror such that the detected tilt errors may be eliminated by means of closed loop servo control. In this manner, an interferometer with a modestly precise mechanical mirror movement guide may be used for spectroscopy requiring very precisely parallel and wide range mirror displacements.

The alignment sensing is done with the use of a continuously operating laser which produces an essentially monochromatic beam of radiation. The intensity variation of this radiation at the output of the interferometer is essentially sinusoidal as a function of mirror displacement, undergoing one full cycle for a mirror displacement equal to one half the laser wavelength.

It has been found, however, that the detection system for mirror alignment is subject to the effect of spurious signals produced by stray reflections from surfaces of the beamsplitter-conpensator used in the spectrometer. The present invention relates to apparatus which eliminates such spurious signals.

Specifically, the present invention is used in a spectrometer having a laser reference source providing a generally square-shaped beam. The spectrometer also includes a beamsplitter-compensator, a fixed mirror and a moving mirror. A system for detecting variations in alignment between the mirrors is provided including three detectors located adjacent the output field and arranged at the vertices of a triangle. Stray reflections at the beamsplitter-compensator create laterally displaced ghost images of the reference source and, thus, spurious signals at the detectors. The invention relates to the improvement comprising means orienting the beamsplitter-compensator with respect to the reference beam so that the ghost images are displaced along a diagonal of the square-shaped beam and a mask in the input laser beam restricting the beam to an L-shaped area which when it impinges on the output field includes the vertices of the triangle.

BRIEF DESCRIPTION OF THE DRAWINGS

FIG. 1 shows the basic elements of a Fourier transform spectrometer;

FIG. 2 shows the object field under illumination by a reference laser source and varying conditions of mirror tilt;

FIG. 4 shows the beamsplitter-compensator; and

FIG. 5 shows multiple images produced by stray reflections at the beamsplitter-compensator.

DESCRIPTION OF THE PREFERRED EMBODIMENT

Figure 3:
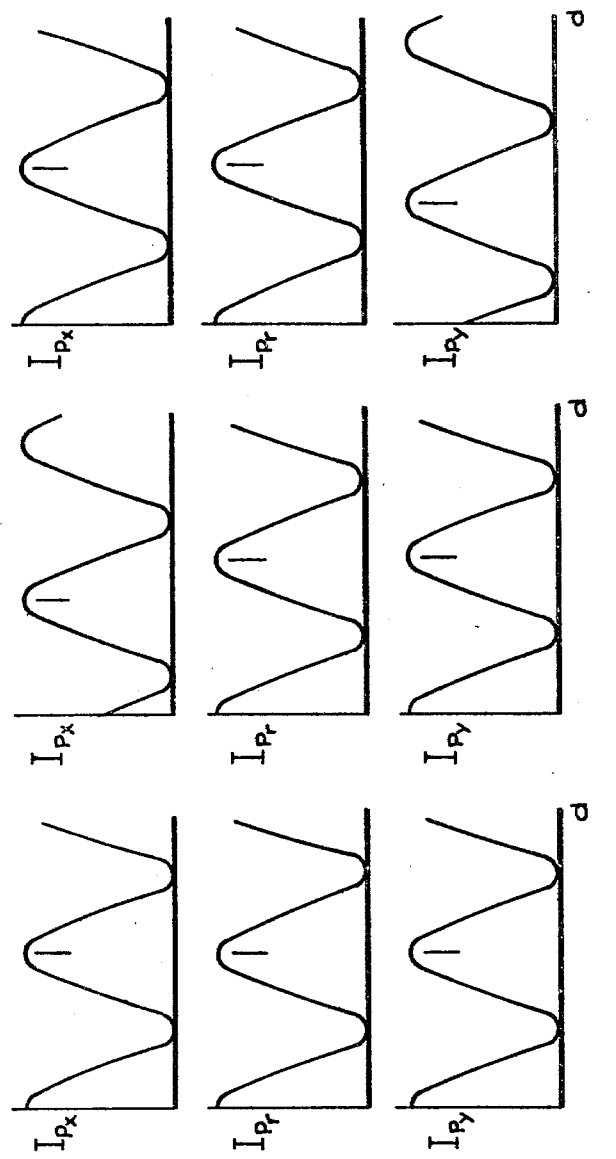
FIG. 3 shows the detector outputs under varying conditions.

FIG. 1 shows in outline form a typical Fourier transform spectrometer incorporating features of the invention described below. Radiation from the source 10 is divided in a beamsplitter-compensator 12 into two beams reflected from mirrors $M_1$ and $M_2$ and the path length of one of the beams varied by varying the position of mirror $M_2$. The beams are recombined in beamsplitter-compensator 12 and the resulting interference patterns appear at a plane P where they are detected by a detector 11. The variation in the intensity of the detected energy with mirror position is termed an interferogram and it contains information regarding all the frequencies present in the signal from source 10. By performing a Fourier transform on the interferogram the spectrum of the signal from the source can be obtained.

By introducing laser radiation into an interferometer co-axially with the source uder study, a reference cosine function is obtained by detecting intensity variations in the output field which can be used as a source of precise information on the position of the moving mirror. In the rapid scanning technique the mirror displacement is done at an approximately constant speed and the reference cosine function is used to provide sample pulses for the digitization of the interferogram signal.

The laser reference source is also used in an alignment control system which maintains the reflecting surface of the moving mirror parallel to its initial orientation. Thus, the overall alignment of the spectrometer optics is maintained with resulting precision in measurement. The alignment control system will be explained with reference to FIG. 2. When the system is properly aligned, that is the images of $M_1$ and $M_2$ seen at a screen S placed in the parallel beam are parallel, the output field at S is uniformly illuminated as shown at FIG. 2a. If, however, the moving mirror $M_2$ develops a tilt with respect to its desired orientation then a bar pattern of the laser light appears in the output field. This is shown at FIG. 2b for a horizontal tilt of $M_2$ and at FIG. 2c for a vertical tilt of $M_2$.

To utilize this information, three photodetectors $P_4$, $P_y$ and $P_x$ are located adjacent the output field positioned at the vertices of a right-angled triangle. Only photodetectors Py and Px are visible in FIG. 1. Thus, the signal received by each of the three photodetectors is a function of parallel displacement of mirror $M_2$. This is shown in FIGS. 3a, b and c for the illumination conditions shown in FIGS. 2a, b and c. It can be seen that a phase difference results between $P_r$ and the detector which is placed along the same direction for which an alignment error occurs. Thus a phase difference between the $P_r$ signal and the $P_y$ signal indicates a misalignment in the vertical direction and a phase difference between the $P_r$ signal and the $P_x$ signal indicates a misalignment in the horizontal direction.

Using the signals from the detectors, error signals can be generated through use of an error signal generator 30 and applied to the transducer mechanisms, indicated schematically by transducer 32, to correct the alignment of the moving mirror. The preferred form of transducer is either a magnetoelectric rotational drive connected to the mirror by a spring lever mechanism or a piezoelectric drive connected directly to the mirror. The complete control system has other features relating to the resolution of ambiguous display patterns in the output field and for correcting large misalignments on start-up. These are not necessary for an understanding of the present invention and will not be further described.

Beamsplitter-compensator 12 is shown in diagrammatic form in FIG. 4. Surface 51 is generally half silvered so that an incident beam 40 is split into beams 41 and 42 of about equal intensity transmitted to mirrors $M_1$ and $M_2$. The plate defined by surfaces 52 and 53 performs the compensating function of ensuring that the optical path length of the beams is equal for all wavelengths. In practice, there are imperfections in the manner in which the beamsplitter-compensator functions due to departure from idealized performance. Typically, surfaces 50 and 52 will exhibit about 5% reflectance rather than 100% transmission thereby reflecting two additional, weak, beams to $M_1$. Similarly, with respect to the returned beam 41 surfaces 53 and 54 will exhibit about 5% reflectance thereby creating another two, weak, images.

Thus, in addition to the primary pattern in the output field, as shown in FIG. 2, there are other displaced and weaker patterns which cause spurious signals at the detectors. It has been customary to use a generally square-shaped laser reference beam. Gost images displaced parallel to one side of the square will affect the response of some but not all of the detectors as shown in FIG. 5. By selecting the orientation of the beamsplitter-compensator 12 with respect to a square-shaped beam as shown in FIG. 5, however, and using a mask 60 located in the input laser beam as illustrated in FIG. 1 with an L-shaped aperture (shown schematically at A in FIG. 5) for the laser beam the effect of these ghost images can be removed. That is, referring to FIG. 5, those images displaced downwardly and to the right do not impinge on the detectors and those displaced upwardly and to the left have the interfering part blocked out by the mask.

Thus, there has been described an improved system for reducing the effect of ghost images resulting from stray reflectance in the beamsplitter-compensator plate.

The embodiments of the invention in which an exclusive property or privilege is claimed are defined as follows:

1. In a spectrometer having a laser reference source providing a generally square-shaped beam, a beamsplitter-compensator, a fixed mirror and a moving mirror, a system for detecting variations in alignment between the mirrors including three detectors located adjacent the output field and arranged at the vertices of a triangle, and wherein stray reflections at the beamsplitter-compensator create laterally displaced ghost images of the reference source, the improvement comprising means orienting the beamsplitter-compensator with respect to the reference beam so that the ghost images are displaced along a diagonal of the square-shaped beam and a mask in the input laser beam restricting the laser beam to an L-shaped area which when it impinges on the output field includes the vertices of the triangle.

2. The improvement of claim 1 wherein the detectors are arranged at the vertices of a right-angled triangle.

* * * * *